UNITED STATES PATENT OFFICE.

LUCIEN EILERTSEN, OF PARIS, FRANCE.

ANTISEPTIC AND PERFUMED BLOCK.

975,405.  Specification of Letters Patent. Patented Nov. 15, 1910.

No Drawing.  Application filed August 20, 1904. Serial No. 221,545.

*To all whom it may concern:*

Be it known that I, LUCIEN EILERTSEN, a citizen of the French Republic, residing at Paris, in France, have invented an Improved Process of Manufacturing Antiseptic and Perfumed Blocks, of which the following is a full, clear, and exact description.

The object of the present invention is a process for manufacturing antiseptic and perfumed blocks intended to produce a particular action, such as a therapeutic, a chemical or other action.

The process consists of the introduction into nitrocellulose while it is in a liquid solution, of an inert substance soluble in water, preferably a soluble gum, such as gum arabic in a finely divided condition, in such a way as to facilitate the release of the active substances contained in the blocks. Each particle of gum leaves, as it is dissolved, a space in the nitrocellulose, thus gradually transforming these nitrocellulose blocks into a porous condition.

The object of the process is to obtain in an aqueous medium the slow and lasting disengagement of active substances. The chemical action of such disengagement may be the oxidation of any suitable substance by incorporating in the nitrocellulose, the said substance producing oxygen or oxygenated water in the nascent state, such as peroxid of lime, peroxid of magnesia, peroxid of soda and the like. For antiseptic mouth washing the oxygenated water already mentioned might be used or other antiseptic. In this last case perfumes or substances pleasant to the taste, may be added, thus producing a new process for perfuming the mouth.

The manufacture of the preparation is as follows: A solution is formed by dissolving nitrocellulose in a suitable solvent, as acetone for instance, and to this solution is added peroxid of lime, peroxid of magnesia, peroxid of soda or the like. I then add gum arabic either in solution or in the form of a dry powder or when finely pulverized to the above solution, and after the acetone has been allowed to sufficiently evaporate the remaining substance forms a stiff block. The preferred proportions for mixing will be 60 parts acetone (or other solvent of nitrocellulose), 20 parts gum arabic and 20 parts nitrocellulose. When the block is brought into the mouth the fine particles of the gum arabic will dissolve and the block become porous which naturally exposes all ingredients containing oxygen. To make the blocks agreeable to the taste a substance such as suitable sugars or perfumes in any desired proportions are to be added.

The proportion of the peroxid of lime, peroxid of magnesia, or peroxid of soda used in carrying out my process may be varied. As an average proportion, however, I would say that for a block containing one-half gram of nitrocellulose and one-half gram of gum, I would use 10 centigrams of one of the peroxids above mentioned. The addition of an active substance such as one of the peroxids mentioned is not however essential to the carrying out of my process, though I would prefer to use such active substance.

If a peroxid such as described is to be used, the same should not be hydrated, and it should be incorporated when there is no water present and the absence of water may be obtained by having removed all the water wherein the gum arabic has been dissolved, in the case where the gum arabic has been added in a powdered form, or highly subdivided condition and while in a dry state, the peroxid which has never been in contact with water will preserve entirely its property of producing oxygenated water.

My blocks are intended for use as a therapeutic, antiseptic, or perfuming agent for the mouth, and are intended to be allowed to either remain at rest while in the mouth, or they may be masticated.

What I claim is:—

The hereindescribed process of manufacturing blocks for use as described which consists in dissolving nitrocellulose in a suitable solvent, such as described, adding thereto an active substance such as described which is adapted to form oxygenated water when in contact with water, mixing a substance agreeable in perfume and taste and also gum arabic with the solution, and evaporating the solvent.

In testimony whereof I have hereunto set my hand in the presence of two witnesses.

LUCIEN EILERTSEN.

Witnesses:
ADOLPHE STURM,
HANSON C. COXE.